Aug. 6, 1929.  A. LEE  1,723,429
AUTO SIGNAL
Filed Sept. 6, 1927  2 Sheets-Sheet 2
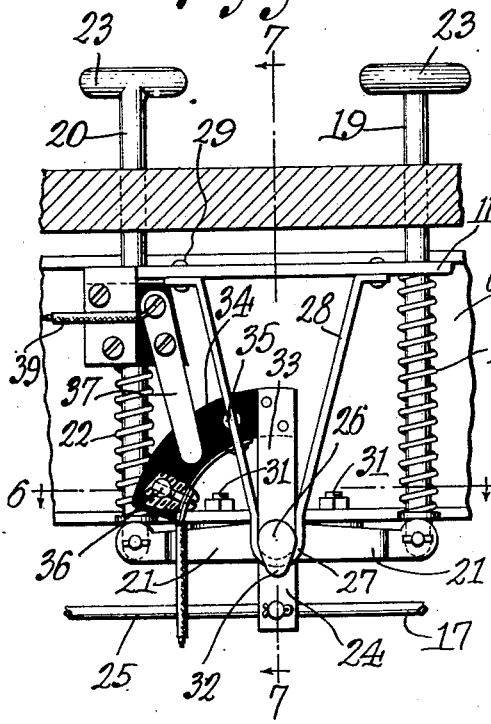
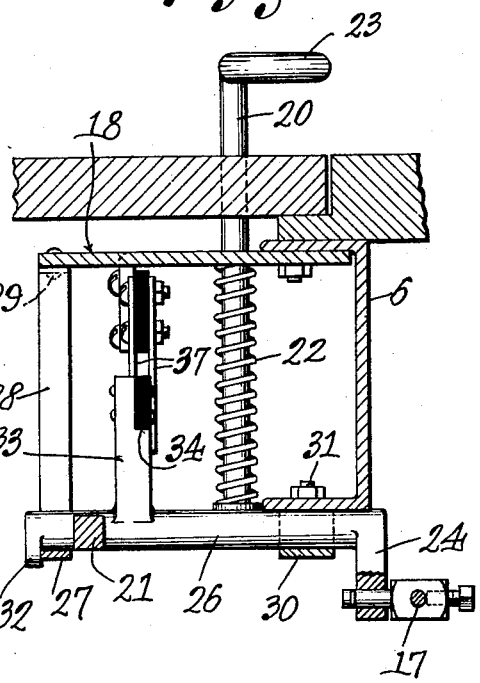
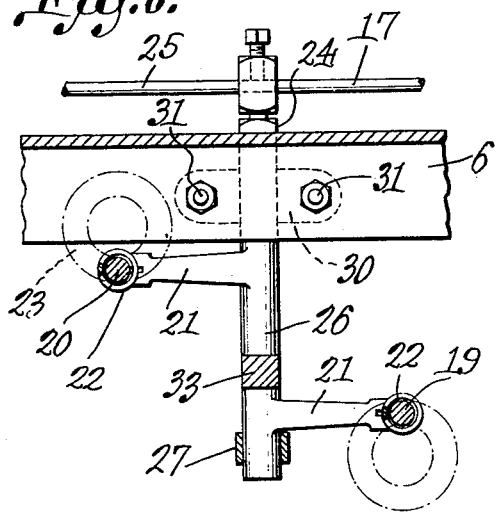
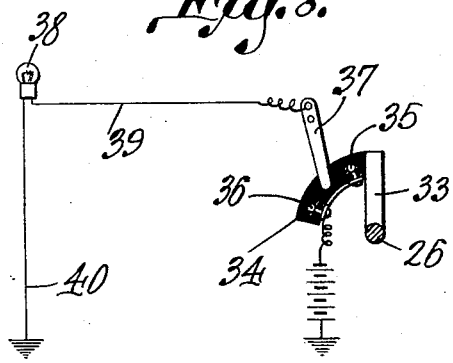
Alfred Lee, Inventor
By CA Snow & Co.
Attorneys Patented Aug. 6, 1929.

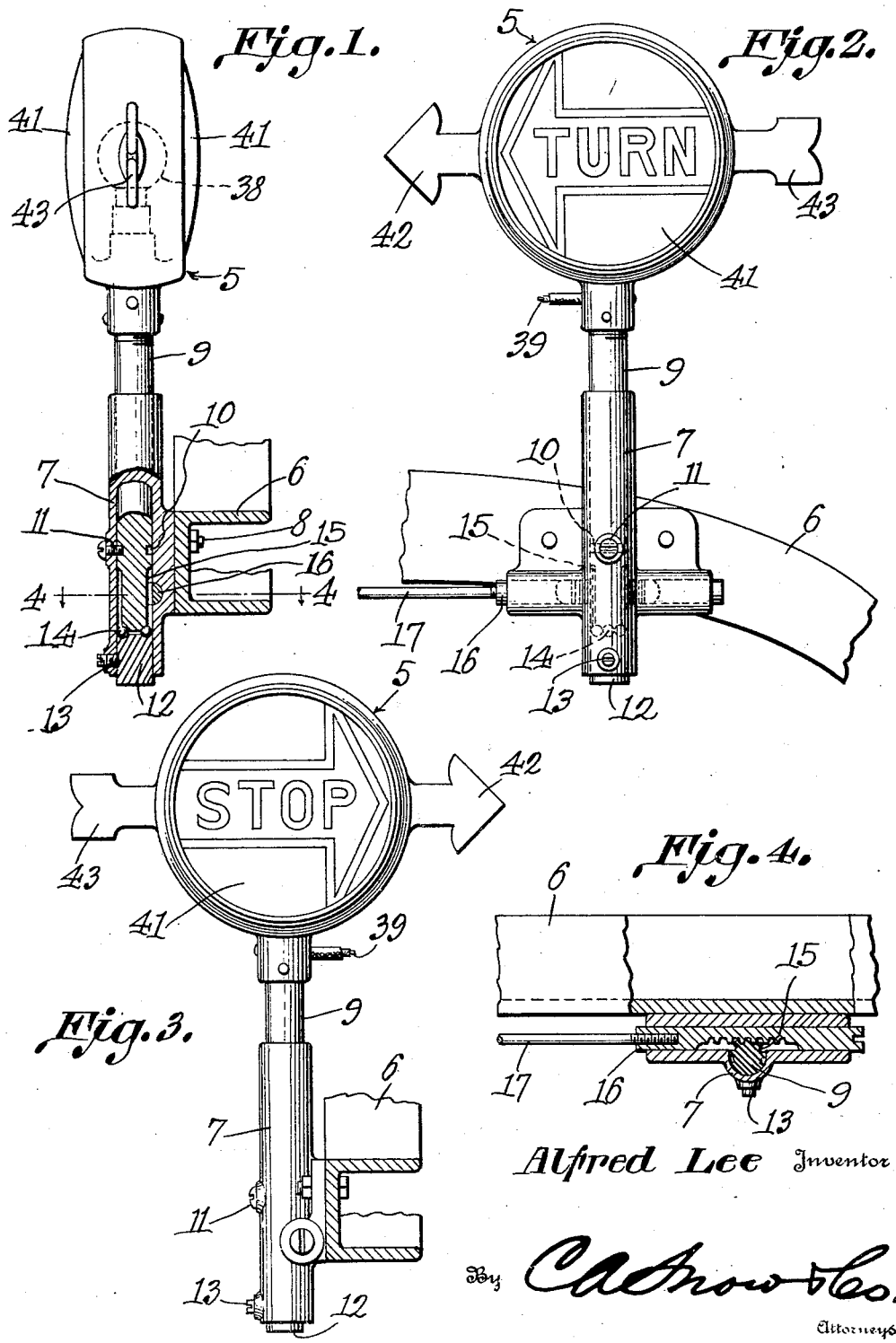

1,723,429

UNITED STATES PATENT OFFICE.

ALFRED LEE, OF BELLINGHAM, WASHINGTON.

AUTO SIGNAL.

Application filed September 6, 1927. Serial No. 217,721.

This invention has reference to signaling devices, and more particularly to a mechanical signaling device especially designed for use on motor vehicles, the primary object of the invention being to provide means whereby the operator of the motor vehicle equipped with the device, may signal to approaching automobiles or pedestrians the direction of travel to be taken by the vehicle, thereby reducing the possibilities of collision, to the minimum.

Another object of the invention is to provide a signaling device of this character which will be automatically illuminated when the signaling device is turned, to the end that the signal will be as effective in the dark as in the light.

A still further object of the invention is the provision of a signal at the front and rear of a vehicle, the signals being simultaneously operated by a single movement of the operating pedals and rods.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 1 is a side elevational view of a signaling device constructed in accordance with the invention and illustrating the manner of securing the device.

Figure 2 is a front elevational view of the signal.

Figure 3 is a front elevational view of the opposite side of the signal.

Figure 4 is a sectional view taken on line 4—4 of Figure 1.

Figure 5 is an elevational view illustrating the operating mechanism.

Figure 6 is a sectional view taken on line 6—6 of Figure 5.

Figure 7 is a sectional view taken on line 7—7 of Figure 5.

Figure 8 is a diagrammatic view illustrating the lighting circuit.

Referring to the drawings in detail, the signal is indicated generally by the reference character 5 and while I show one of the signaling devices, it is to be understood that it is contemplated to position one of these signaling devices at the front end of the motor vehicle, and another signaling device of identical construction, at the rear of the motor vehicle and to provide an operating mechanism which will simultaneously operate the signaling devices to indicate the direction of travel to be taken by the motor vehicle.

As shown, the device is secured to one of the side rails of the frame of the motor vehicle, the side rail being indicated by the reference character 6. The reference character 7 designates a tubular bearing member which acts as the support for the signal, which bearing member is secured to the side wall 6 by means of the bolt 8.

Positioned within the bearing member 7 is a lamp post 9 which is formed with a peripheral groove 10 to accommodate the inner extremity of the screw 11 that locks the lamp post against vertical movement. Secured within the bearing member 7 at the lower end thereof, is a plug 12, there being provided a securing screw 13 contacting with the plug to hold the plug in position.

The upper extremity of the plug 12 provides a support for the ball bearings 14 that rest in a groove formed in the upper end of the plug 12, which ball bearings also contact with the lower end of the post 9 to reduce friction at the lower end of the post 9 to the minimum, and insure a free operation of the signal.

Elongated teeth 15 are formed at the lower end of the post 9, which teeth contact with the teeth of the rack bar 16 carried at one end of the controlling rod 17, which rod is supported in suitable brackets and extends to a position under the floor board of the vehicle for purposes to be hereinafter more fully described.

Positioned directly under the floor board is a frame work 18 which is formed with openings through which the pedal shanks 19 and 20 respectively extend, the lower ends of the pedal shanks 19 and 20 being connected with the arm 21 at the ends of the arm as clearly shown by Figure 5. Coiled springs 22 are mounted on the shanks 19 and 20 and are so connected with the shanks 19 and 20 that they will normally urge the shanks to their initial or inactive positions after the pedals which are indicated at 23 and secured at the upper ends of the shanks 19 and 20, have been depressed in the operation of the signal.

This arm 21 has a depending arm 24 with which the rod 17 connects, while the rod 25 which extends towards the rear end of the car and connects with a similar signaling device at the rear of the car, also has connection with this arm 24, to the end that rods 17 and 25 will be operated simultaneously.

The arm 21 is carried by the shaft 26, one end of the shaft being mounted in the curved portion 27 of the bracket 28 that is secured to the frame work as at 29, the opposite end of the shaft being mounted in the bearing 30 secured to the frame work by means of the bolt 31, there being provided a lug 32 at one end of the shaft 26 to insure against longitudinal movement of the shaft 26.

Extending upwardly from the shaft 26 is an arm 33 that carries a downwardly extended switch member 34 formed of suitable insulating material such as fiber or the like, the switch member being provided with contact points 35 and 36, which are in circuit with a suitable source of electric supply. Cooperating with the contact point 35 is a spring arm 37 that is in circuit with the lamps 38 located in the signals proper, through the wire 39, the ground wire being indicated at 40.

Thus it will be seen that when either of the pedals 22 is depressed, the arm 37 will contact with one of the contact points 34, lighting the light to display the signal. Mounted at the upper end of the lamp post 9 is the signal proper which includes a circular casing having its sides closed by means of the members 41 formed of translucent material and colored preferably red, there being certain indicating characters such as an arrow and letters indicating "Turn" or "Stop" formed on the members 41 so that a person may readily determine the movements to be taken by the vehicle.

To further accentuate the direction indicated by the signal, an arrow head such as indicated at 42 is formed on the signal proper and extends beyond one edge thereof, while at the opposite edge of the signal is provided an extension 43 indicating the feathered extremity of an arrow. Should the operator of a vehicle equipped with a signal of this character reach to turn to the right or left, the operator's foot is depressed on the proper pedal which rocks the arms 21 moving the rods 17 and 25, which in turn impart rotary movement to the lamp posts 9 connected therewith, swinging the signals proper to bring indicating characters directly before persons approaching the vehicle from the front or rear, to indicate the movements to be taken by the vehicle.

I claim:

A signaling device including a horizontally disposed tubular bearing member, an elongated vertical tubular bearing member formed integral therewith and disposed intermediate the ends of the horizontal member, the vertical tubular member having an opening in one side thereof arranged adjacent to the horizontal tubular bearing member to establish communication between the tubular bearing members, a lamp post positioned within the vertical tubular member and having teeth, a rack bar operating in the horizontal tubular bearing member and having a cut away portion in the side thereof, teeth in the base of the cut away portion, the outer ends of the teeth lying below the surface of the rack bar and meshing with the teeth of the lamp post, and a removable plug secured within the lower end of the vertical tubular member for supporting the weight of the lamp post, and balls resting on the plug and contacting with the lower end of the lamp post to reduce friction between the lamp post and plug.

In testimony that I claim the foregoing as my own, I have hereto affixed my signature.

ALFRED LEE.